Jan. 22, 1957       E. M. ARTHUR       2,778,582
MEANS FOR HOLDING ELECTRIC CABLE IN A COILED CONDITION
Filed Jan. 5, 1954
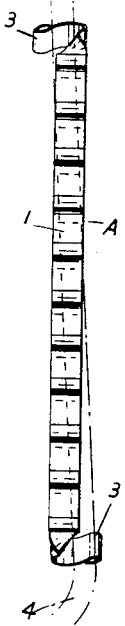
FIG. 2.
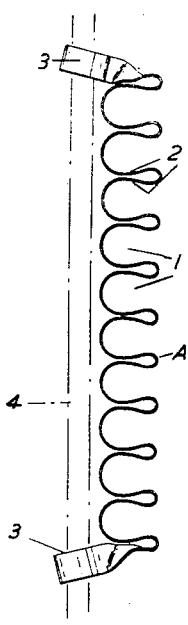
FIG. 1.
FIG. 4.
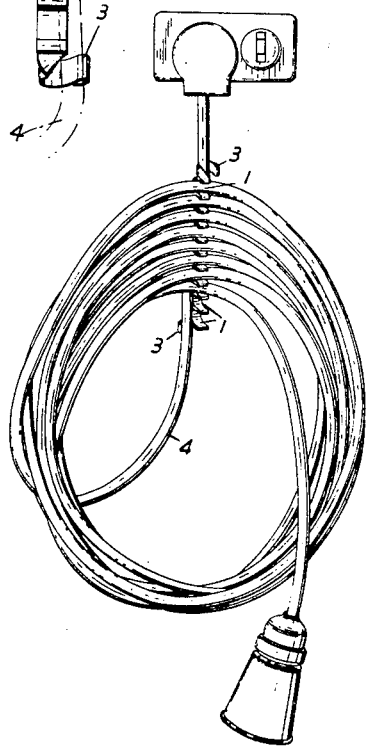
FIG. 3.
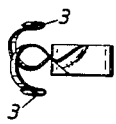
*Evan M. Arthur* Inventor
By *C. A. Snow & Co.* Attorneys

United States Patent Office 2,778,582
Patented Jan. 22, 1957

2,778,582
MEANS FOR HOLDING ELECTRIC CABLE IN A COILED CONDITION

Evan Meirion Arthur, West Heath, Birmingham, England

Application January 5, 1954, Serial No. 402,316

1 Claim. (Cl. 242—96)

Electric cable is usually of a length extending from a stationary or connected end to give the maximum range of its operative end, and for shorter ranges the cable is usually loose and causes inconvenience, and this invention has for its object means whereby any of the surplus length of cable can be arranged in a coiled or looped condition in a holder which is fixed to and carried by the cable and which readily allows additional lengths to be released. A further object is to construct a holder which is mounted on the cable by lateral engagement therewith, thereby enabling the holder to be fixed on a length of the cable without having to detach objects on each end of the cable. With the foregoing objects in view, the invention resides in the combination and arrangement of parts hereinafter described and claimed and illustrated in the accompanying drawings.

Referring to the drawings:

Figure 1 is a front view of a holder constructed according to this invention.

Figure 2 is a side elevation.

Figure 3 is an end view, and

Figure 4 illustrates a holder in use.

According to a convenient embodiment of the invention, a member A having a row of recesses along its length is formed of a length of strip material and conveniently of spring metal which is bent along its length to form a row of U-shaped spring clips 1. The row may be in alignment or staggered. Each arm 2 of the clip lies adjacent the arm 2 of the adjacent clip and the arms are bowed inwardly from the bend joining the arms 2 of adjacent clips to reduce the width of the clip at or near the mouth through which the cable 4 or the like is forced into the wider portion at the bottom of the clip and thus retain and hold by spring pressure the cable or the like in the wider portion of the clip. The resiliency of the clip or the resiliency of the cable or the like enables the latter to be forced into the clip. The axes of the cable anchor clips 1 are parallel and the mouths face the front of the holder A. The holder formed of the connected row of clips is fixed at each end to the cable or the like conveniently by means of a U-shaped spring mounting clip 3 formed by shaping each end of the metal strip to form a clip with the axis at right angles to the said coil anchor clips 1 of the row of clips. The metal at each end is bent back from the outer arm of an end clip 1 and is twisted through 90° and then bent into a U-shape, the end clips 3 extending laterally in opposite directions so that the row of clips lie over the cable or the like. The clips 3 extend to the rear of the clips 1 so that the tye cable passes from one clip 3 to the other clip behind the row of clips 1, which thus allows coils of surplus cable to be attached to the clips and lie outside the length of cable between the clips 3. Thus arranged, when the cable or the like is engaged in or withdrawn from a clip of the row, there will be no liability of detaching the device.

The device may be constructed in any other desired manner and separate U-shaped clips may be fixed to a mounting strip. In lieu of spring or U-shaped clips at both ends of the holder means may be provided for encircling the cable or the like to attach the device to the cable. The holder is entirely carried by the cable or the like and therefore the holder can be fitted to any length of cable or the like to hold any surplus length in coils which hang from the holder. The size of the coils can be of any length according to the surplus length to be carried by the holder. With the clip thus constructed, the coils hang down over the front of the holder.

Having thus described the invention, what is claimed as new and desired to be secured by Letters Patent, is:

A holder for storing a surplus length of electric cable or holding a length of cable in a coiled condition, comprising a member which is adapted to be fixed to and detached from the cable by lateral engagement or disengagement with the cable and which holder is formed of a length of spring material bent to form a connected row of coil holding U-shaped spring clips arranged horizontally one above the other and parallel to one another and with their mouths arranged transversely of and at the front of the holder, so that a length of cable, extending from the portion to which the holder is fixed, can be arranged in coils with each successive coil held in successive clips of the row, and means for detachably fixing each end of the holder to the cable by an engagement laterally of the cable comprising a U-shaped spring mounting clip at each end of and bent from said length of material forming the holder, said latter U-shaped spring clips being arranged at the back of the holder with their axes at right angles to the said coil holding spring clips and lengthwise of the holder and with their mouths facing laterally of the holder in opposite directions, so that a length of cable to which the holder is mounted passes longitudinally of and behind said parallel row of coil holding clips from the said mounting clip at the one end of the holder to the said mounting clip at the other end of the holder.

References Cited in the file of this patent

UNITED STATES PATENTS

| | | |
|---|---|---|
| 1,258,093 | Corder | Mar. 5, 1918 |
| 2,397,291 | Robertson | Mar. 26, 1946 |
| 2,455,683 | King | Dec. 7, 1948 |
| 2,533,341 | Alfano | Dec. 12, 1950 |